(12) United States Patent
Tsirkin et al.

(10) Patent No.: US 9,875,128 B2
(45) Date of Patent: Jan. 23, 2018

(54) USING HYPERVISOR TRAPPING FOR PROTECTION AGAINST INTERRUPTS IN VIRTUAL MACHINE FUNCTIONS

(71) Applicant: Red Hat Israel, Ltd., Ra'anana (IL)

(72) Inventors: Michael Tsirkin, Yokneam Illit (IL); Paolo Bonzini, Turate (IT)

(73) Assignee: Red Hat Israel, Ltd., Ra'anana (IL)

( * ) Notice: Subject to any disclaimer, the term of this patent is extended or adjusted under 35 U.S.C. 154(b) by 225 days.

(21) Appl. No.: 14/603,984

(22) Filed: Jan. 23, 2015

(65) Prior Publication Data

US 2016/0216983 A1 Jul. 28, 2016

(51) Int. Cl.
*G06F 9/46* (2006.01)
*G06F 9/455* (2006.01)
*G06F 9/48* (2006.01)

(52) U.S. Cl.
CPC ........ *G06F 9/45558* (2013.01); *G06F 9/4812* (2013.01); *G06F 2009/45579* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 6,944,699 B1 | 9/2005 | Bugnion et al. | |
| 7,853,744 B2 | 12/2010 | Mahalingam et al. | |
| 8,234,432 B2 * | 7/2012 | Serebrin | G06F 9/4812 710/261 |
| 8,239,655 B2 * | 8/2012 | Goggin | G06F 3/061 711/203 |
| 8,453,143 B2 | 5/2013 | Mahalingam et al. | |
| 8,656,482 B1 | 2/2014 | Tose et al. | |
| 8,719,817 B2 * | 5/2014 | Aswani | G06F 9/45558 718/1 |
| 8,832,688 B2 | 9/2014 | Tang et al. | |
| 2007/0240157 A1* | 10/2007 | Herenyi | G06F 9/485 718/1 |
| 2010/0125709 A1* | 5/2010 | Hall | G06F 12/1036 711/154 |
| 2013/0276057 A1 | 10/2013 | Smith et al. | |
| 2014/0013326 A1* | 1/2014 | Neiger | G06F 9/455 718/1 |
| 2014/0173628 A1 | 6/2014 | Ramakrishnan Nair | |

(Continued)

OTHER PUBLICATIONS

Nakajima et al., Intel Look Inside, Extending KVM Models Toward High-Performance NFV, Oct. 14, 2014 (28 pages).

(Continued)

*Primary Examiner* — Bradley Teets
(74) *Attorney, Agent, or Firm* — K&L Gates LLP

(57) ABSTRACT

A system, methods, and apparatus for using hypervisor trapping for protection against interrupts in virtual machine functions are disclosed. A system includes memory, one or more physical processors, a virtual machine executing on the one or more physical processors, and a hypervisor executing on the one or more physical processors. The hypervisor reads an interrupt data structure on the virtual machine. The hypervisor determines whether the interrupt data structure points to an alternate page view. Responsive to determining that the interrupt data structure points to an alternate page view, the hypervisor disables a virtual machine function.

20 Claims, 6 Drawing Sheets

(56) References Cited

U.S. PATENT DOCUMENTS

2014/0283056 A1 9/2014 Bachwani et al.
2015/0281126 A1* 10/2015 Regula .................. H04L 67/26
                                                    709/212

OTHER PUBLICATIONS

Nakajima, Intel Look Inside, Xen as High-Performance NFV Platform, Aug. 18, 2014 (19 pages).

* cited by examiner

Default Page Table 181

| 310A<br>x0001 | 320A<br>Read-Only | 330A<br>x03FF |
|---|---|---|
| 310B<br>x0002 | 320B<br>Read-Write | 330B<br>x040F |
| 310C<br>x0003 | 320C<br>Executable | 330C<br>x041F |
| 310D<br>x0004 | 320D<br>Executable Only | 330D<br>x042F |
| 310E<br>x0005 | 330E<br>Inaccessible | 330E<br>x043F |

Alternate Page Table 182

| 340A<br>x0001 | 350A<br>Read-Write | 360A<br>x01AF |
|---|---|---|
| 340B<br>x0002 | 350B<br>Read-Write | 360B   VM Function<br>x01FF |
| 340C<br>x0003 | 350C<br>Read-Write | 360C   VM Function<br>x024F |
| 340D<br>x0004 | 350D<br>Read-Write | 360D   VM Function<br>x029F |
| 340E<br>x0005 | 350E<br>Read-Write | 360E   VM Function<br>x02EF |
| 340F<br>x0006 | 350F<br>Read-Write | 360F<br>x033F |

FIG. 3

Alternate Page View 420

- 440A Read-Write
- 440B VM Function Read-Write
- 440C VM Function Read-Write
- 440D VM Function Read-Write
- 440E VM Function Read-Write
- 440F Read-Write Default Page View 410

- 430A Read-Only
- 430B Read-Write
- 430C Executable
- 430D Executable Only
- 430E Inaccessible

FIG. 4

USING HYPERVISOR TRAPPING FOR PROTECTION AGAINST INTERRUPTS IN VIRTUAL MACHINE FUNCTIONS

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as hypervisor, above the hardware and below the virtual machines. A hypervisor may run directly on the server hardware without an operating system beneath it or as an application running under a traditional operating system. A hypervisor may virtualize the physical layer and provide interfaces between the underlying hardware and virtual devices of virtual machines. Processor virtualization may be implemented by the hypervisor scheduling time slots on one or more physical processors for a virtual machine, rather than a virtual machine actually having a dedicated physical processor.

A virtualized computer system may provide routing and processing of interrupts. An interrupt generally refers to an event that requires a processor to execute event-specific instructions, which might involve the processor's holding the current thread of execution and/or switching contexts.

SUMMARY

The present disclosure provides a new and innovative system, methods and apparatus for using hypervisor trapping for protection against interrupts in virtual machine functions.

In an example embodiment, a system includes memory, one or more physical processors, a virtual machine executing on the one or more physical processors, and a hypervisor executing on the one or more physical processors. The hypervisor activates a trap to the hypervisor prior to an execution of an instruction that loads an interrupt data structure on the virtual machine. The hypervisor reads the interrupt data structure on the virtual machine. The hypervisor determines based on reading the interrupt data structure whether the interrupt data structure points to an alternate page view. Responsive to determining that the interrupt data structure points to an alternate page view, the hypervisor disables a virtual machine function.

Additional features and advantages of the disclosed method and apparatus are described in, and will be apparent from, the following Detailed Description and the Figures.

BRIEF DESCRIPTION OF THE FIGURES

FIG. 3 a block diagram of an example default page table and alternate page table according to an example embodiment of the present disclosure.

FIG. 4 is a block diagram of exemplary page views and pages according to an example embodiment of the present disclosure.

DETAILED DESCRIPTION OF EXAMPLE EMBODIMENTS

Figure 1:
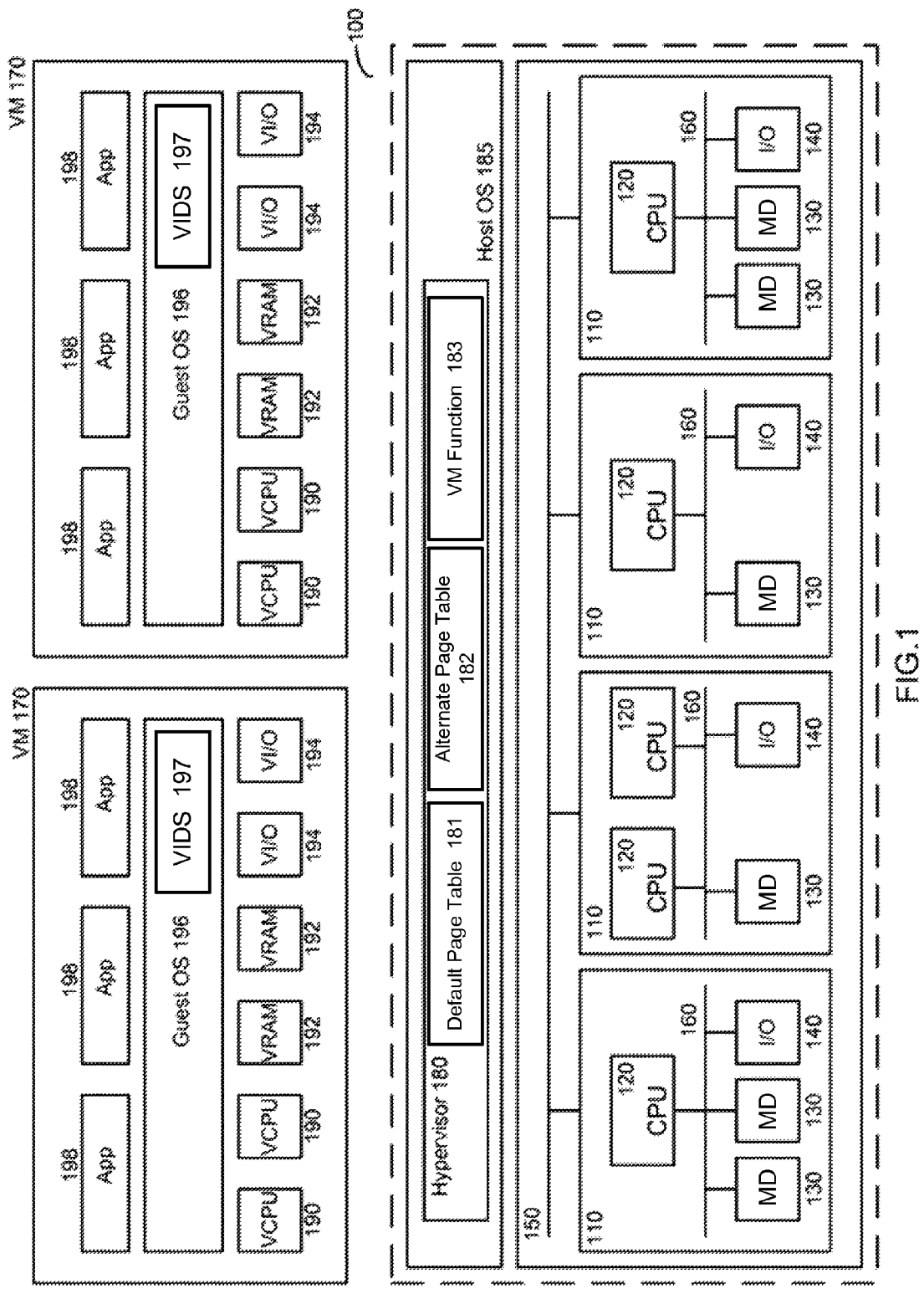
FIG. 1 is a block diagram of an example multiprocessor computer system according to an example embodiment of the present disclosure.

FIG. 1 depicts a high-level component diagram of an example multi-processor (or host) computer system 100 in accordance with one or more aspects of the present disclosure. The computer system 100 may include one or more interconnected nodes 110. Each node 110 may in turn include one or more physical processors 120 communicatively coupled to memory devices (MD) 130 and input/output (I/O) devices 140.

As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device refers to a volatile or non-volatile memory device, such as RAM, ROM, EEPROM, or any other device capable of storing data. As discussed herein, I/O device refers to a device capable of providing an interface between one or more processor pins and an external device capable of inputting and/or outputting binary data.

Processors 120 may be interconnected using a variety of techniques, ranging from a point-to-point processor interconnect, to a system area network 150, as shown in FIG. 1, such as an Ethernet-based network. Local connections within each node 110, including the connections between a processor 120 and a memory 130 and between a processor 120 and an I/O device 140 may be provided by one or more local buses 160 of suitable architecture, for example, peripheral component interconnect (PCI).

As noted above, computer system 100 may run multiple virtual machines 170, by executing a software layer (e.g. hypervisor 180) above the hardware and below the virtual machines, as schematically shown in FIG. 1. In one illustrative example, the hypervisor 180 may be a component of the operating system 185 executed by the computer system 100. Alternatively, the hypervisor 180 may be provided by an application running under the host operating system 185, or may run directly on the host computer system 100 without an operating system beneath it. The hypervisor 180 may virtualize the physical layer, including processors, memory, and I/O devices, and present this virtualization to virtual machines 170 as virtual devices, including virtual processors (VCPU) 190, virtual memory 192, and virtual I/O devices 194.

Figure 2:
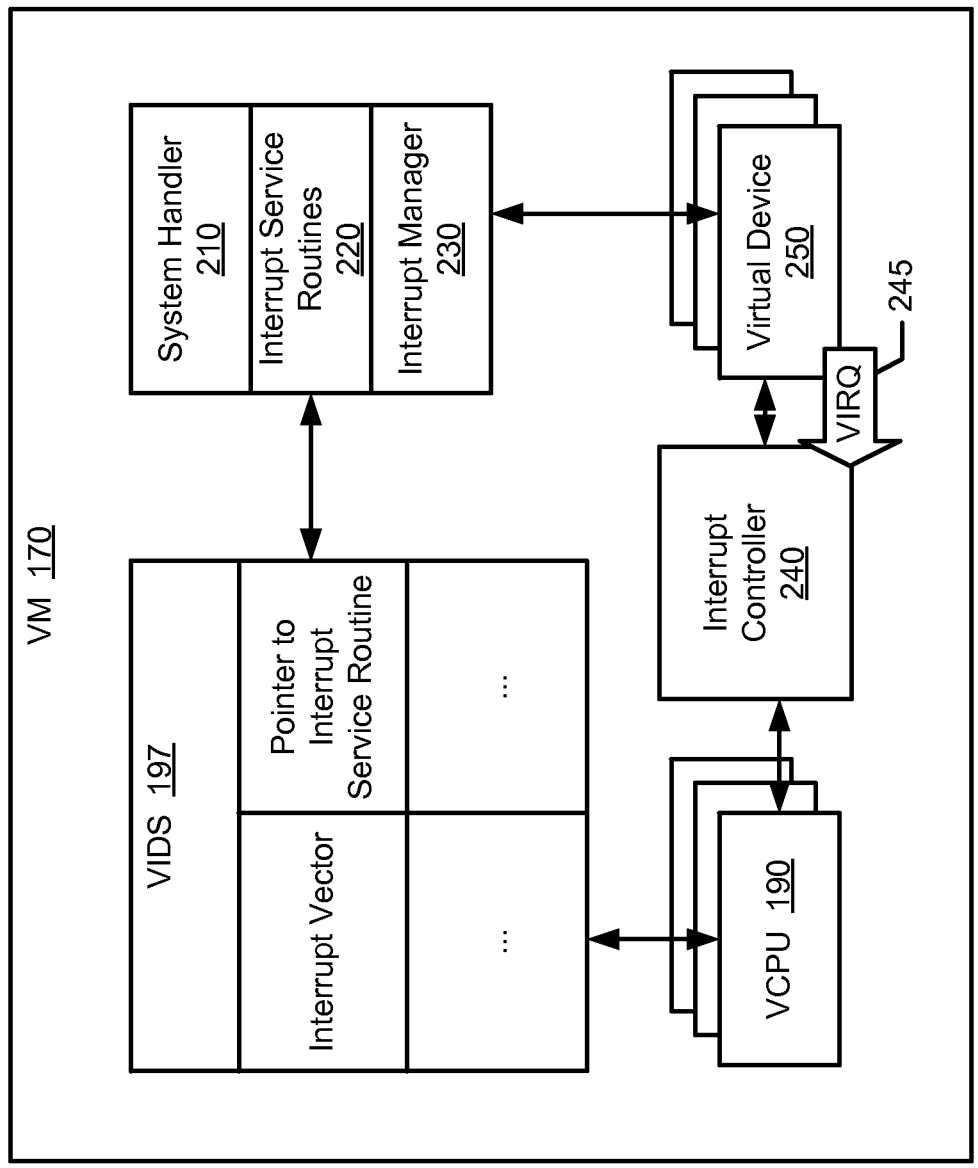
FIG. 2 is a block diagram of an example virtual machine including an interrupt data structure according to an example embodiment of the present disclosure.

A virtual machine 170 may execute a guest operating system 196 which may utilize the underlying virtual processors 190, virtual memory 192, and virtual I/O devices 194. One or more applications 198 may be running on a virtual machine 170 under the guest operating system 196. The guest operating system may include a virtual interrupt data structure (VIDS) 197. Exemplary embodiments of the VIDS 197 are described in greater detail below and as shown in FIG. 2.

A virtual machine 170 may include multiple virtual processors (VCPU) 190. Processor virtualization may be implemented by the hypervisor 180 scheduling time slots on one or more physical processors 120 such that from the guest operating system's perspective those time slots are scheduled on a virtual processor 190.

The hypervisor 180 may provide one or more virtual machine functions (VM Functions 183) to a virtual machine 170. The code that a VM Function 183 runs on the physical processor(s) 120 may utilize the resources of host operating system (Host OS) 185, such as the memory devices 130, and the input/output devices 140 as well as the resources of one or more of the virtual machines 170 including the virtual processors 190, the virtual memory 192, and the virtual I/O devices 194. For example, the VM Function 183 may be called by a VM 170 to transfer data to, or access the resources of another VM 170. By contrast, each VM 170 may be limited to the use of its own resources including its VCPUs 190, virtual memory 192, and virtual I/O devices 194 unless it invokes a VM Function 183 as described below.

In an example embodiment, the VM Function 183 may be invoked for a VM 170, by the guest OS 196 that is running on it. In an example embodiment, a VM Function 183 may only be invoked if hypervisor 180 provides permission or grants a request. For example, a VM 170 or guest OS 196 may invoke a VM Function to handle a task more efficiently or using greater resources than are presently available to the VM 170 or guest OS 196. In an example embodiment, the hypervisor 180 may also deny the request by causing an undefined opcode exception or a general protection fault exception whenever the VM Function 183 is invoked.

The hypervisor may also include a default page table 181 and an alternate page table 182. Exemplary embodiments of these data structures are described in greater detail below and as shown in FIG. 3.

FIG. 2 illustrates an example embodiment of a virtual machine 170. During operation, an event may be triggered by the operation of virtual device 250. The virtual device 250 can report the event by sending a virtual interrupt request (VIRQ 245) to one of the VCPUs 190 via an interrupt controller 240. The VIRQ 245 is sent with an interrupt vector that is assigned to the event. The VIRQ 245 is passed to a system handler 210, which consults a virtual interrupt data structure (VIDS) 197, using the interrupt vector as an index. The VIDS 197 associates each interrupt vector with an interrupt service routine 220. For example, the VIDS 197 is indexed by interrupt vectors, allowing the system handler 210 to use interrupt vectors to locate pointers to the corresponding interrupt service routines 220. The interrupt service routines 220 may then handle the event by causing the VCPU 190 to execute event handling code to perform appropriate operations.

The present disclosure is not limited to the structure of the system illustrated in FIG. 2. In an example embodiment, the virtual device 250 may be external to the VM 170 and/or the VIDS 197 may be stored externally to the VM 170. In another example embodiment, the system handler 210, interrupt service routines 220, and interrupt manager 230 may be on the hypervisor 180.

FIG. 3 illustrates a default page table 181 and an alternate page table 182 according to an exemplary embodiment of the present disclosure. In general, the hypervisor 180 manages the memory usage of the VMs 170. Both virtual memory and physical memory may be divided into pages which are identified with a unique number (e.g., Page Frame Number (PFN) 310A-E or 340A-F). Exemplary embodiments of pages and page views are described in greater detail below and as shown in FIG. 4.

A page table is a data structure used by the hypervisor 180 to store a mapping of physical addresses for the guest (e.g., used by the guest OS 196 on VM 170) to physical addresses for the host (e.g., used by the host hardware platform 100). Accordingly, address translation from guest-physical to host-physical memory addresses is handled using page tables. For example, each process or application operating within the VMs 170 may be given the impression that there is a contiguous section of memory available, when in reality, the available memory may be spread across various memory devices 130.

The page tables 181 and 182 comprise entries that map a virtual PFN 310A-E (or 340A-F) with a physical address 330A-E (or 360A-F). The page tables 181 and 182 may be used together with any paging data structure used by the VMs 170 to support translation from virtual to physical addresses (e.g., 32-bit linear address space using a two-level hierarchical paging structure, Physical Address Extension mode, INTEL Extended Memory 64 Technology mode, etc.).

In an example embodiment, page tables 181 and 182 may also include a protection identifier 320A-E (or 350A-F). The protection identifier 320A-E (or 350A-F) indicates the access protection status of a page for the page view described by the page table. A protection status may used to define for example that a given page is writable (or read-write), write-protected (or read-only), executable (or executable and readable), executable only, inaccessible (or non-present), etc. For example, in FIG. 3, the page associated with virtual PFN x0001 and memory location x03FF has been defined in default page table 181 as 'Read-Only'. The page associated with virtual PFN x0001 is associated with memory location x01AF in alternate page table 182 and has been defined as 'Read-Write'. The hypervisor 180 may be used to control to protection status of pages. In addition, in an example embodiment, the page tables 181 and 182 may include additional information not shown in FIG. 3 including statistics information, background information, dirty identifiers which indicate that modifications to a page must be written back to disk, etc.

In an example embodiment, one or more default page tables 181 may be maintained by the hypervisor 180 for each of the VMs 170 which maps virtual addresses to physical addresses that are accessible by each of the VMs 170. For example, the page table entries in the default page table 181 corresponding to the virtual PFNs (e.g. 310A-E) of an interrupt data structure (e.g., VIDS 197) on the VM 170 is accessed by physical CPU 120 when looking up pointers to interrupt service routines. The pointers to these interrupt service routines themselves provide a virtual PFN that is consulted in the default page table 181 to convert the pointers to physical addresses of the host computer system 100. In an example embodiment, in order to convert a virtual PFN to a host physical address, the hypervisor 180 may also consult page table 181, together with any paging data structure that the VMs 170 use to support translation from virtual to physical addresses. One or more alternate page tables 182 may be maintained by the hypervisor 180 for each of one or more VM Functions 183 which maps virtual addresses to physical addresses that are accessible by each of the VM Functions 183. For example, a portion of the entries in an alternate page table 182 (e.g., 360B-360E) may correspond to physical pages at which the VM Function 183 is located. In an example embodiment, one or more alternate page tables 182 may additionally be maintained by the hypervisor 180 for an interrupt data structure (e.g. VIDS 197) on the VM 170. As illustrated in FIG. 3, in an example embodiment, an alternate page table 182 may be more expansive than a default page table 181 in order to permit the VM Functions 183 to access a larger set of memory resources than the VMs 170 have access to. However, the sizes of different page tables may vary and that the degree of overlap between different page tables may vary (e.g., there may be no overlap).

FIG. 4 illustrates page views and pages, for example a default page view 410, an alternate page view 420, and pages 430A-E and 440A-F, in accordance with an example embodiment of the present disclosure. As noted above, a page may be a portion of physical or virtual memory designated for storing data. As used herein, a page view denotes a mapping from guest-physical addresses to host-physical addresses. For example, a default page view 410 is a page view that is referenced by a default page table 181. In an example embodiment, the default page view 410 may denote the mapping from virtual PFNs of a VM 170 to host-physical addresses, as used during normal execution of the virtual machine. An alternate page view 420 is a page view that is referenced by an alternate page table 182, as used during execution of the VM Function 183. In an example embodiment, the alternate page view 420 may denote a mapping from addresses designated for use by the VM Function 183 to host-physical addresses. In the illustrated example in FIG. 4, only a portion of pages on alternate page view 420 are designated for use by the VM Function 183 (e.g., 440B-E) and the remaining pages (e.g., 440A and 440F) refer to locations in the alternate page view 420 that are outside the memory location of the VM Function 183. As illustrated in FIG. 4, pages (e.g., 430A and 440A) may be defined by access protections (described above in more detail) such as 'Read-Only' or 'Read-Write' in accordance with their respective page table protection identifiers (e.g., 320A and 350A). A VM Function 183 may change the mapping of guest-physical addresses to host-physical addresses, e.g., page views 410 or 420, by changing the page tables 181 or 182 that the processor 120 uses to perform memory accesses in the VM 170.

Figure 5:
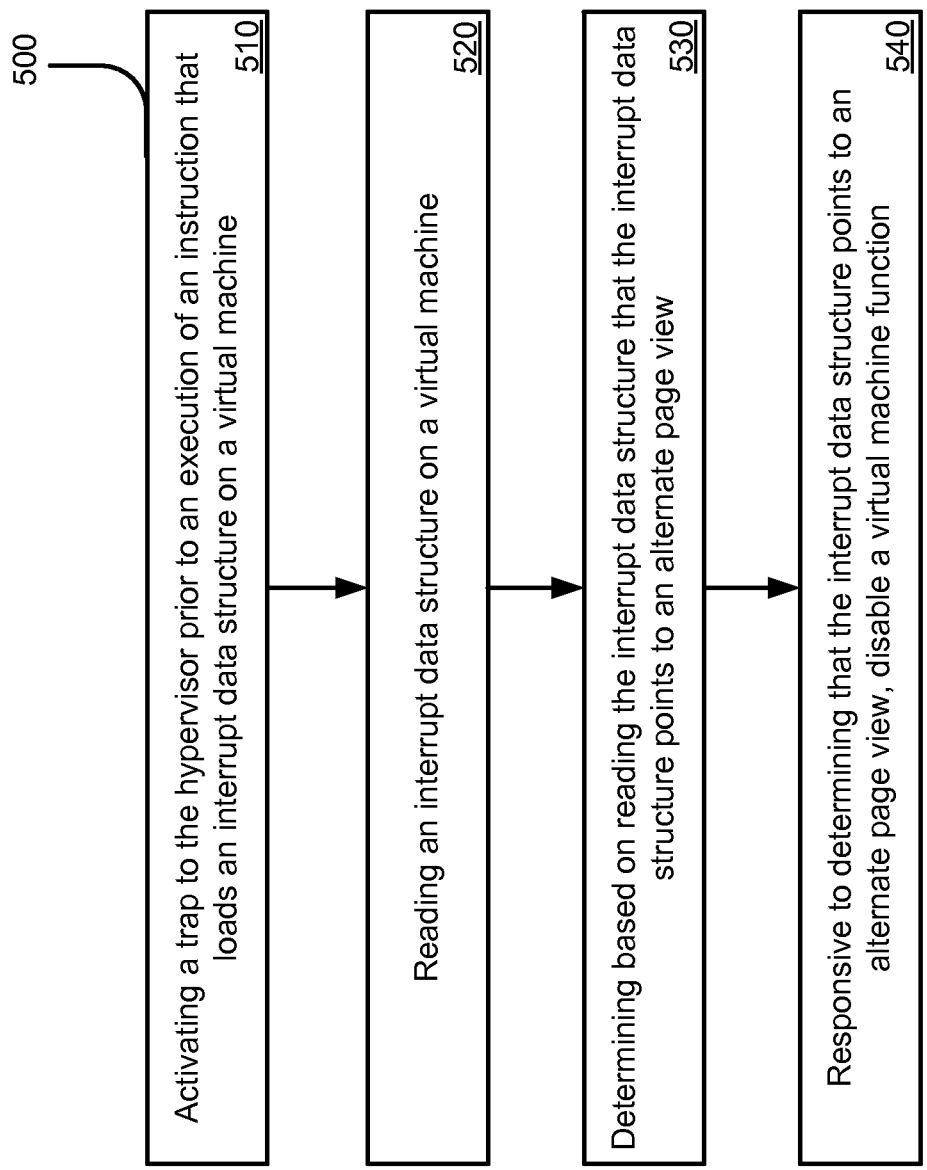
FIG. 5 is a flowchart illustrating an example process for using interrupt descriptor exiting for protection against interrupts in virtual machine functions according to an example embodiment of the present disclosure

FIG. 5 illustrates a flowchart of an example method 500 for using interrupt descriptor exiting for protection against interrupts in virtual machine functions. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software (such as is run on a general purpose computer system or a dedicated machine), or a combination of both. In an example embodiment, the method is performed by a hypervisor (e.g., hypervisor 180 of FIG. 1).

The example method 500 starts and the hypervisor 180, block 510, activates a trap to the hypervisor prior to an execution of an instruction that loads an interrupt data structure on a virtual machine. For example, prior to a guest OS 196 executing an instruction that loads VIDS 197 on VM 170, the hypervisor 180 may activate a trap. Activating a trap to hypervisor 180 for a particular instruction in this manner can be used to cause the hypervisor to emulate the execution of guest instructions on the code of the hypervisor itself. For example, when the guest OS 196 executes an instruction that loads VIDS 197 on VM 170, the prior activated trap may cause a descriptor exit to the hypervisor 180 that causes the hypervisor to emulate running the guest OS 196 on the hypervisor's own code and processors. The use of descriptor exiting is merely exemplary, and there are many other ways to activate a trap to the hypervisor in accordance with the present disclosure. In an exemplary embodiment, activating a trap may include requesting that a processor 120 enable a trap to the hypervisor 180 such that responsive to the guest OS 196 executing an instruction, the enabled (i.e. activated) trap causes the hypervisor 180 to emulate running the guest OS 196.

The hypervisor 180 then, block 520, reads an interrupt data structure on a virtual machine. In an example embodiment, the hypervisor 180 reads an interrupt data structure 197 by first detecting a 'load pointer to interrupt data structure' instruction, whose operands could include a pointer to the first entry of the interrupt data structure. For example, the hypervisor 180 may load an internal register code with this pointer and call an analysis routine internal to the hypervisor 180.

The hypervisor 180 then, block 530, determines based on reading the interrupt data structure whether the interrupt data structure points to an alternate page view. For example, the hypervisor 182 may determine whether the interrupt service routines 220 associated with the interrupt data structure 197 points to an executable page in the alternate page table 182. In an example embodiment, the hypervisor 180 makes this determination by retrieving the addresses of the interrupt service routines 220 from the interrupt data structure 197 of a particular VM 170 and reading the entries that correspond to the addresses in one or more page tables (e.g. page tables 181 and/or 182) on the hypervisor 180. For example, the hypervisor 180 may read the address for the interrupt service routine and then the entry for the address in one or more alternate page tables 182 to determine if the interrupt service routine can be accessed as an alternate page view 420 corresponding to the alternate page tables 182.

If the hypervisor 180 determines that the interrupt data structure 197 points to an alternate page view 420, then the hypervisor 180 disables a virtual machine function 183 (block 540). For example, if the hypervisor 180 determines that an interrupt service routine 220 listed in the interrupt data structure 197 is executable when accessed as an alternate page view 420, then the hypervisor 180 disables a virtual machine function 183. A virtual machine function 183 may be disabled in a variety of ways. In an example embodiment, the hypervisor 180 may disable the virtual machine function 183 by modifying code that invokes virtual machine function 183. For example, this code modification might involve adding or replacing code in the memory location where the VM Function 183 execution instruction is stored. This modification may involve incorporating code that returns an error message when executed or generating a hypercall that executes code in the hypervisor 180 that would have been available in the alternate page view 420.

In another example embodiment, the hypervisor 180 disables the virtual machine function by setting an access flag of the virtual machine on which the analyzed interrupt data structure resides, to restrict access to one or more memory resources. For example, the hypervisor 180 can set a flag of one or more VCPUs 190 on the virtual machine 170 so that the virtual machine 170 will not be able to access alternate page views 420 or alternate resources. Accordingly, upon encountering a VM Function 183 instruction, a processor 120 may then exit to the hypervisor 180 and execute code in the hypervisor 180 that returns an error message, or execute code in the hypervisor 180 that would have been available in the alternate page view 420.

In another example embodiment, the hypervisor 180 disables the virtual machine function by modifying access permissions of one or more memory resources accessed by the virtual machine function.

In another example embodiment, the hypervisor 180 disables the VM Function 183 by modifying one or more alternate page views 420 associated with the VM Function 183 that the hypervisor 180 seeks to disable to match a default page view 410 associated with the virtual machine. Additionally, the hypervisor 180 may determine that certain alternate page views 420 are associated with a VM Function 183 that the hypervisor 180 seeks to disable. Then the hypervisor 180 can modify one or more alternate page tables 182 to make these page views non-present or inaccessible.

The hypervisor 180 may determine which VM function 183 to disable based on the following. Upon determining that the interrupt data structure of interest points to an alternate page view 420 (as described in block 520), the hypervisor 180 may analyze which virtual machine function corresponds to the one or more alternate page tables 182 that contain pointers to the alternate page view 420 described in determining block 520.

In yet another example embodiment, the hypervisor 180 modify the permissions of the interrupt data structure 197 to restrict access by the virtual machine 170. For example, the hypervisor can change the alternate page view 420 for the interrupt data structure 197 of a virtual machine 170, modifying the permissions of the interrupt data structure 197 to restrict access by the virtual machine 170. The hypervisor 180 may modify these permissions in alternate page tables 182 to make one or more alternate page views 420 that correspond to the interrupt data structure non-present or inaccessible to the virtual machine 170. In another example embodiment, the hypervisor 180 can modify permissions of the interrupt data structure to make the interrupt data structure non-writable or read-only by the virtual machine. The hypervisor 180 can modify permissions in this manner preemptively, without the above discussed analyzing and determining according to blocks 510 and 520, or in addition to example method 500. For example, a hypervisor may modify permissions in the alternate page table responsive to a determination that an interrupt data structure 197 does not point to alternate page view 420. More particularly, if the hypervisor 180 determines that the interrupt service routines 220 listed in the interrupt data structure 197 are not executable when accessed as alternate page views 420, the hypervisor 180 may modify the permissions of the interrupt data structure 197 to make the interrupt data structure non-writable by the virtual machine 170.

Disabling a VM Function 183 or modifying the permissions of a page data structure 181, 182 as described in the present disclosure, significantly limits the access to virtual and physical resources of a computer system by the source of an interrupt (e.g. a VM 170, guest OS 196, application 198, physical or virtual devices, malicious code, etc.) through the use of an interrupt data structure 197. Moreover, injecting interrupts via a virtual machine while a virtual machine function is executing may cause one or more VMs, host OS's, or guest OS's to crash, for example, if the interrupt data structure 197 points to code in memory that adversely affects execution of code for VM Function 183, or accesses resources that are not available in a default page view 410, but which are available in an alternate page view 420. The present disclosure advantageously protects a computer system 100 from the above described problems.

Figure 6:
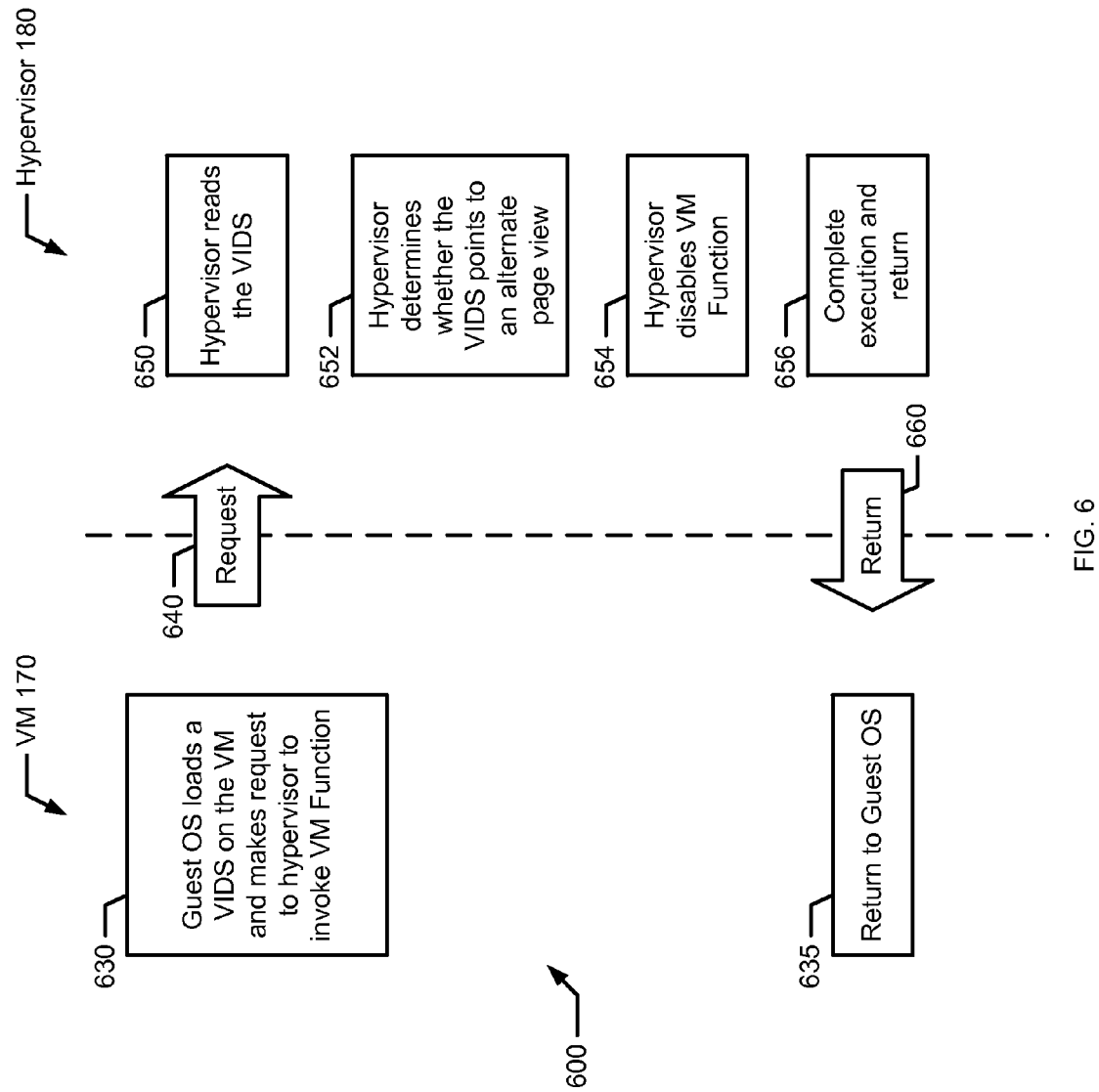
FIG. 6 is a flow diagram illustrating a guest operating system and hypervisor according to an example embodiment of the present disclosure.

FIG. 6 illustrates a flow diagram including a VM 170 and hypervisor 180 in accordance with an exemplary embodiment of the present disclosure. At block 630, the guest OS 196 loads a VIDS 197 on VM 170 prior to sending a request to the hypervisor 180 to invoke a virtual machine function 183. This request is transmitted to the hypervisor 180 (block 640). The hypervisor 180 may then determine whether to block the VM Function 183. At block 650, hypervisor 180 reads VIDS 197. The hypervisor 180 may then determine whether an interrupt data structure 197 points to an alternate page view 420 as described above and shown in FIG. 5 (block 652). For example, the hypervisor 180 may determine whether an interrupt service routine 220 listed in VIDS 197 points to an executable page in an alternate page table 182. In response to this determination the hypervisor 180 may then disable VM Function 183 as described above and shown in FIG. 5 (block 654). Then, the hypervisor may finish executing and return (blocks 656 and 660).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first exemplary aspect of the present disclosure, a system comprises a memory, one or more processors coupled to the memory, a virtual machine executing on the one or more processors, and a hypervisor executing on the one or more processors to activate a trap to the hypervisor prior to an execution of an instruction that loads an interrupt data structure on the virtual machine, read the interrupt data structure on the virtual machine, determine based on reading the interrupt data structure that the interrupt data structure points to an alternate page view, and responsive to determining that the interrupt data structure points to an alternate page view, disable a virtual machine function. In accordance with another exemplary aspect of the present disclosure, which may be used in combination with the first aspect, the hypervisor determines that the interrupt data structure points to an alternate page view by retrieving one or more addresses of the interrupt service routines from the interrupt data structure and reading one or more entries that correspond to the one or more addresses in a page data structure. In accordance with another exemplary aspect of the present disclosure, which may be used in combination with any one or more of the preceding aspects, the hypervisor determines that the interrupt data structure points to an alternate page view by retrieving one or more addresses of the interrupt service routines from the interrupt data structure and reading one or more entries that correspond to the one or more addresses in two or more page data structures. In accordance with another exemplary aspect of the present disclosure, which may be used in combination with any one or more of the preceding aspects, the hypervisor determines that the interrupt data structure points to an alternate page view by retrieving one or more addresses of the interrupt service routines from the interrupt data structure and reading one or more entries that correspond to the one or more addresses in an alternate page data structure. In accordance with another exemplary aspect of the present disclosure, which may be used in combination with any one or more of the preceding aspects, the hypervisor disables the virtual machine function by modifying code that invokes the virtual machine function. In accordance with another exemplary aspect of the present disclosure, which may be used in combination with any one or more of the preceding aspects, the hypervisor disables the virtual machine function by modifying code that invokes the virtual machine function including incorporating code that returns an error message when executed. In accordance with another exemplary aspect of the present disclosure, which may be used in combination with any one or more of the preceding aspects, the hypervisor disables the virtual machine function by setting an access flag of the virtual machine to restrict access to one or more memory resources. In accordance with another exemplary aspect of the present disclosure, which may be used in combination with any one or more of the preceding aspects, the hypervisor disables the virtual machine function by setting an access flag of the virtual machine to restrict access to one or more memory resources that can be accessed by the virtual machine function. In accordance with another exemplary aspect of the present disclosure, which may be used in combination with any one or more of the preceding aspects, the hypervisor disables the virtual machine function by modifying an alternate page data structure to match a default page data structure. In accordance with another exemplary aspect of the present disclosure, which may be used in combination with any one or more of the preceding aspects, the hypervisor modifies a permission of the interrupt data structure. In accordance with another exemplary aspect of the present disclosure, which may be used in combination with any one or more of the preceding aspects, the hypervisor modifies a permission of the interrupt data structure including making the alternate page view non-present to the virtual machine. In accordance with another exemplary aspect of the present disclosure, which may be used in combination with any one or more of the preceding aspects, the hypervisor modifies a permission of the interrupt data structure including making the interrupt data structure non-writable by the virtual machine.

In a second exemplary aspect of the present disclosure, a method comprises activating, by a hypervisor executing on a computer system, a trap to the hypervisor prior to an execution of an instruction that loads an interrupt data structure on a virtual machine, reading, by the hypervisor, the interrupt data structure on the virtual machine, determining, by the hypervisor, based on reading the interrupt data structure that the interrupt data structure points to an alternate page view, and responsive to determining that the interrupt data structure points to an alternate page view, disabling, by the hypervisor, a virtual machine function. In accordance with another exemplary aspect of the present disclosure, which may be used in combination with any one or more of the preceding aspects, the hypervisor determines that the interrupt data structure points to an alternate page view by retrieving one or more addresses of the interrupt service routines from the interrupt data structure and reading one or more entries that correspond to the one or more addresses in a page data structure. In accordance with another exemplary aspect of the present disclosure, which may be used in combination with any one or more of the preceding aspects, the hypervisor determines that the interrupt data structure points to an alternate page view by retrieving one or more addresses of the interrupt service routines from the interrupt data structure and reading one or more entries that correspond to the one or more addresses in two or more page data structures. In accordance with another exemplary aspect of the present disclosure, which may be used in combination with any one or more of the preceding aspects, the hypervisor determines that the interrupt data structure points to an alternate page view by retrieving one or more addresses of the interrupt service routines from the interrupt data structure and reading one or more entries that correspond to the one or more addresses in an alternate page data structure. In accordance with another exemplary aspect of the present disclosure, which may be used in combination with any one or more of the preceding aspects, the hypervisor disables the virtual machine function by modifying code that invokes the virtual machine function. In accordance with another exemplary aspect of the present disclosure, which may be used in combination with any one or more of the preceding aspects, the hypervisor disables the virtual machine function by modifying code that invokes the virtual machine function including incorporating code that returns an error message when executed. In accordance with another exemplary aspect of the present disclosure, which may be used in combination with any one or more of the preceding aspects, the hypervisor disables the virtual machine function by setting an access flag of the virtual machine to restrict access to one or more memory resources. In accordance with another exemplary aspect of the present disclosure, which may be used in combination with any one or more of the preceding aspects, the hypervisor disables the virtual machine function by setting an access flag of the virtual machine to restrict access to one or more memory resources that can be accessed by the virtual machine function. In accordance with another exemplary aspect of the present disclosure, which may be used in combination with any one or more of the preceding aspects, the hypervisor disables the virtual machine function by modifying an alternate page data structure to match a default page data structure. In accordance with another exemplary aspect of the present disclosure, which may be used in combination with any one or more of the preceding aspects, the hypervisor modifies a permission of the interrupt data structure. In accordance with another exemplary aspect of the present disclosure, which may be used in combination with any one or more of the preceding aspects, the hypervisor modifies a permission of the interrupt data structure including making the alternate page view non-present to the virtual machine. In accordance with another exemplary aspect of the present disclosure, which may be used in combination with any one or more of the preceding aspects, the hypervisor modifies a permission of the interrupt data structure including making the interrupt data structure non-writable by the virtual machine.

In a third exemplary aspect of the present disclosure, a computer-readable non-transitory storage medium comprises executable instructions that, when executed by a computer system, cause the computer system to activate, by a hypervisor executing on a computer system, a trap to the hypervisor prior to an execution of an instruction that loads an interrupt data structure on a virtual machine, read, by the hypervisor, an interrupt data structure on a virtual machine, determine, by the hypervisor, based on reading the interrupt data structure that the interrupt data structure points to an alternate page view, and responsive to determining that the interrupt data structure points to an alternate page view, disable, by the hypervisor, a virtual machine function. In accordance with another exemplary aspect of the present disclosure, which may be used in combination with any one or more of the preceding aspects, the hypervisor determines that the interrupt data structure points to an alternate page view by retrieving one or more addresses of the interrupt service routines from the interrupt data structure and reading one or more entries that correspond to the one or more addresses in a page data structure. In accordance with another exemplary aspect of the present disclosure, which may be used in combination with any one or more of the preceding aspects, the hypervisor determines that the interrupt data structure points to an alternate page view by retrieving one or more addresses of the interrupt service routines from the interrupt data structure and reading one or more entries that correspond to the one or more addresses in two or more page data structures. In accordance with another exemplary aspect of the present disclosure, which may be used in combination with any one or more of the preceding aspects, the hypervisor determines that the interrupt data structure points to an alternate page view by retrieving one or more addresses of the interrupt service routines from the interrupt data structure and reading one or more entries that correspond to the one or more addresses in an alternate page data structure. In accordance with another exemplary aspect of the present disclosure, which may be used in combination with any one or more of the preceding aspects, the hypervisor disables the virtual machine function by modifying code that invokes the virtual machine function. In accordance with another exemplary aspect of the present disclosure, which may be used in combination with any one or more of the preceding aspects, the hypervisor disables the virtual machine function by modifying code that invokes the virtual machine function including incorporating code that returns an error message when executed. In accordance with another exemplary aspect of the present disclosure, which may be used in combination with any one or more of the preceding aspects, the hypervisor disables the virtual machine function by setting an access flag of the virtual machine to restrict access to one or more memory resources. In accordance with another exemplary aspect of the present disclosure, which may be used in combination with any one or more of the preceding aspects, the hypervisor disables the virtual machine function by setting an access flag of the virtual machine to restrict access to one or more memory resources that can be accessed by the virtual machine function. In accordance with another exemplary aspect of the present disclosure, which may be used in combination with any one or more of the preceding aspects, the hypervisor disables the virtual machine function by modifying an alternate page data structure to match a default page data structure. In accordance with another exemplary aspect of the present disclosure, which may be used in combination with any one or more of the preceding aspects, the hypervisor modifies a permission of the interrupt data structure. In accordance with another exemplary aspect of the present disclosure, which may be used in combination with any one or more of the preceding aspects, the hypervisor modifies a permission of the interrupt data structure including making the alternate page view non-present to the virtual machine. In accordance with another exemplary aspect of the present disclosure, which may be used in combination with any one or more of the preceding aspects, the hypervisor modifies a permission of the interrupt data structure including making the interrupt data structure non-writable by the virtual machine.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system of preventing a crash in at least one of a virtual machine, a host operating system, and a guest operating system, the system comprising:
   a memory;
   one or more processors, coupled to the memory;
   a default page table storing one or more default page views;
   an alternate page table storing at least one alternate page view designated for use by a virtual machine function;
   a virtual machine executing on the one or more processors, wherein the virtual machine executes with a default page view, stored in the default page table, in a normal state of execution; and
   a hypervisor executing on the one or more processors to:
   execute the virtual machine with the default page view;
   activate a trap to the hypervisor prior to an execution of an instruction that loads an interrupt data structure on the virtual machine;
   read the interrupt data structure on the virtual machine;
   determine based on reading the interrupt data structure that the interrupt data structure points to an alternate page view, stored in the alternate page table, instead of the default page view, wherein the alternate page view is different from the default page view and the alternate page view includes a memory reference to a memory location outside of the memory location of the virtual machine function; and
   responsive to determining that the interrupt data structure points to the alternate page view instead of the default page view, disable the virtual machine function.

2. The system of claim 1, wherein the hypervisor determines that the interrupt data structure points to the alternate page view by retrieving one or more addresses of the interrupt service routines from the interrupt data structure and reading one or more entries that correspond to the one or more addresses in a page data structure.

3. The system of claim 2, wherein the hypervisor reads the one or more entries that correspond to the one or more addresses in two or more page data structures.

4. The system of claim 2, wherein the page data structure is the alternate page data structure.

5. The system of claim 1, wherein the hypervisor disables the virtual machine function by modifying code that invokes the virtual machine function.

6. The system of claim 5, wherein modifying code of the virtual machine function includes incorporating code that returns an error message when executed.

7. The system of claim 1, wherein the hypervisor disables the virtual machine function by setting an access flag of the virtual machine to restrict access to one or more memory resources.

8. The system of claim 7, wherein the one or more memory resources are memory resources that can be accessed by the virtual machine function.

9. The system of claim 1, wherein the hypervisor disables the virtual machine function by modifying the alternate page data structure to match a default page data structure.

10. The system of claim 1, wherein the hypervisor modifies a permission of the interrupt data structure.

11. The system of claim 10, wherein modifying the permission of the interrupt data structure includes making the alternate page view non-present to the virtual machine.

12. The system of claim 10, wherein modifying the permission of the interrupt data structure includes making the interrupt data structure non-writable by the virtual machine.

13. A method of preventing a crash in at least one of a virtual machine, a host operating system, and a guest operating system, the method, comprising:
    executing a virtual machine with a default page view of one or more default page views stored in a default page table, wherein the virtual machine executes with the default page view in a normal state of execution;
    activating, by a hypervisor executing on a computer system, a trap to the hypervisor prior to an execution of an instruction that loads an interrupt data structure on the virtual machine;
    reading, by the hypervisor, the interrupt data structure on the virtual machine;
    determining, by the hypervisor, based on reading the interrupt data structure that the interrupt data structure points to an alternate page view instead of the default page view, wherein the alternate page view is stored in an alternate page table which stores at least one alternate page view designated for use by a virtual machine function and the alternate page view is different from the default page view and the alternate page view includes a memory reference to a memory location outside of the memory location of the virtual machine function; and
    responsive to determining that the interrupt data structure points to the alternate page view instead of the default page view, disabling, by the hypervisor, the virtual machine function.

14. The method of claim 13, wherein the hypervisor modifies a permission of the interrupt data structure.

15. The method of claim 14, wherein modifying the permission of the interrupt data structure includes making the alternate page view non-present to the virtual machine.

16. The method of claim 14, wherein modifying the permission of the interrupt data structure includes making the interrupt data structure non-writable by the virtual machine.

17. A computer-readable non-transitory storage medium comprising executable instructions of preventing a crash in at least one of a virtual machine, a host operating system, and a guest operating system that, when executed by a computer system, cause the computer system to:
    execute a virtual machine with a default page view of one or more default page views stored in a default page table, wherein the virtual machine executes with the default page view in a normal state of execution;
    activate, by a hypervisor executing on a computer system, a trap to the hypervisor prior to an execution of an instruction that loads an interrupt data structure on the virtual machine;
    read, by the hypervisor, an interrupt data structure on a virtual machine; determine, by the hypervisor, based on reading the interrupt data structure that the interrupt data structure points to an alternate page view instead of the default page view, wherein the alternate page view is stored in an alternate page table which stores at least one alternate page view designated for use by a virtual machine function and the alternate page view is different from the default page view and the alternate page view includes a memory reference to a memory location outside of the memory location of the virtual machine function; and
    responsive to determining that the interrupt data structure points to the alternate page view instead of the default page view, disable, by the hypervisor, the virtual machine function.

18. The computer-readable non-transitory storage medium of claim 17, wherein the hypervisor modifies a permission of the interrupt data structure.

19. The computer-readable non-transitory storage medium of claim 18, wherein modifying the permission of the interrupt data structure includes making the alternate page view non-present to the virtual machine.

20. The computer-readable non-transitory storage medium of claim 18, wherein modifying the permission of the interrupt data structure includes making the interrupt data structure non-writable by the virtual machine.

* * * * *